United States Patent
Unter Ecker

(10) Patent No.: US 11,423,896 B2
(45) Date of Patent: Aug. 23, 2022

(54) GAZE-INITIATED VOICE CONTROL

(71) Applicant: Telefonaktiebolaget LM Ericsson (publ), Stockholm (SE)

(72) Inventor: Oliver Unter Ecker, Los Angeles, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 140 days.

(21) Appl. No.: 16/767,089

(22) PCT Filed: Dec. 21, 2018

(86) PCT No.: PCT/IB2018/060536
§ 371 (c)(1),
(2) Date: May 26, 2020

(87) PCT Pub. No.: WO2019/123425
PCT Pub. Date: Jun. 27, 2019

(65) Prior Publication Data
US 2020/0380977 A1    Dec. 3, 2020

Related U.S. Application Data

(60) Provisional application No. 62/609,959, filed on Dec. 22, 2017.

(51) Int. Cl.
*G10L 15/00*    (2013.01)
*G10L 15/22*    (2006.01)
*G06F 3/01*    (2006.01)
*G06F 3/16*    (2006.01)
(Continued)

(52) U.S. Cl.
CPC .............. *G10L 15/22* (2013.01); *G06F 3/013* (2013.01); *G06F 3/167* (2013.01); *G06V 40/19* (2022.01);
(Continued)

(58) Field of Classification Search
CPC ......... G10L 15/22; G10L 15/25; G06F 3/013; G06F 3/017
See application file for complete search history.

(56) References Cited

U.S. PATENT DOCUMENTS

2006/0192775 A1*   8/2006   Nicholson ............. G06F 1/3203
                                                  345/211
2008/0059175 A1*   3/2008   Miyajima ............... G10L 15/25
                                                  704/246
(Continued)

FOREIGN PATENT DOCUMENTS

FR          3034215 A1     9/2016
WO     2012/158407 A1     11/2012
(Continued)

OTHER PUBLICATIONS

Kaipeng Zhang, et al., "Joint Face Detection and Alignment using Multi-task Cascaded Convolutional Networks", IEEE Signal Processing Letters (SPL), vol. 23, No. 10, retrieved from the Internet: https://kpzhang93.github.io/MTCNN_face_detection_alignment/, pp. 1499-1503, 2016.

*Primary Examiner* — Daniel Abebe
(74) *Attorney, Agent, or Firm* — Nicholson De Vos Webster & Elliott LLP

(57) ABSTRACT

A device initiates voice control through gaze detection. The device detects that a user is gazing at a gaze target. Responsive to that detection, the device captures audio and performs automatic speech recognition of the captured audio to turn the audio into text. The device performs natural language understanding on the text to determine an application-specific command. The device performs application-specific processing for the application-specific command.

18 Claims, 4 Drawing Sheets

(51) Int. Cl.
*G10L 15/26* (2006.01)
*G06V 40/19* (2022.01)

(52) U.S. Cl.
CPC ........ *G10L 15/26* (2013.01); *G10L 2015/223* (2013.01); *G10L 2015/227* (2013.01)

(56) References Cited

U.S. PATENT DOCUMENTS

| | | | |
|---|---|---|---|
| 2008/0130950 A1* | 6/2008 | Miklos | G06F 3/013 |
| | | | 382/103 |
| 2013/0304479 A1 | 11/2013 | Teller et al. | |
| 2013/0342672 A1* | 12/2013 | Gray | G06F 1/1686 |
| | | | 348/78 |
| 2015/0109191 A1* | 4/2015 | Johnson | G06F 3/013 |
| | | | 345/156 |
| 2015/0109192 A1* | 4/2015 | Huang | G06K 9/00597 |
| | | | 345/156 |
| 2015/0268719 A1 | 9/2015 | Li | |
| 2016/0132290 A1* | 5/2016 | Raux | G06F 3/013 |
| | | | 704/275 |
| 2017/0038837 A1* | 2/2017 | Faaborg | G06T 7/70 |
| 2017/0235361 A1 | 8/2017 | Rigazio et al. | |
| 2018/0307303 A1* | 10/2018 | Powderly | G06F 3/017 |
| 2018/0341330 A1* | 11/2018 | Parker | G10L 15/22 |
| 2019/0013018 A1* | 1/2019 | Rekstad | G06F 3/16 |

FOREIGN PATENT DOCUMENTS

| | | | | |
|---|---|---|---|---|
| WO | 2015/001547 A1 | 1/2015 | | |
| WO | WO-2020068375 A1 * | 4/2020 | | G06F 3/165 |

\* cited by examiner

GAZE-INITIATED VOICE CONTROL

CROSS-REFERENCE TO RELATED APPLICATIONS

This application is a National stage of International Application No. PCT/IB2018/060536, filed Dec. 21, 2018, which claims the benefit of U.S. Provisional Application No. 62/609,959, filed Dec. 22, 2017, which are hereby incorporated by reference.

TECHNICAL FIELD

Embodiments of the invention relate to the field of media devices; and more specifically, to gaze-initiated voice control.

BACKGROUND ART

Voice control is offered in media streaming devices and smart speakers and is becoming ubiquitous. At the head of the pipeline for most conventional modern voice processing is a "wake" or "hot" word (referred herein as "wake word") detection. The device listens for the wake word before processing subsequently spoken words. This initiation process is referred to as "wake word initiation" herein. Another method for initiating voice control is pressing a button (e.g., on a remote control), which is referred to as "button initiation" herein.

There currently exist certain challenge(s). Wake word initiation for voice control is cumbersome and can become annoying to users. Wake word initiation creates a hurdle to long-term adoption of the voice control paradigm. Button initiation introduces one additional step and is fraught with ambiguity (people don't know whether to press the button briefly, or hold it pressed while speaking). Button initiation also requires users to pick up and hold a remote control just for voice control initiation.

SUMMARY

Certain aspects of the present disclosure and their embodiments may provide solutions to the challenges identified in the background or other challenges.

A device initiates voice control through gaze detection. The device detects that a user is gazing at a gaze target. Responsive to that detection, the device captures audio and performs automatic speech recognition of the captured audio to turn the audio into text. The device performs natural language understanding on the text to determine an application-specific command. The device performs application-specific processing for the application-specific command.

In an embodiment, prior to detecting that the user is gazing at the gaze target, the device detects motion by the user.

In an embodiment, prior to detecting that the user is gazing at the gaze target, the device performs a calibration step where a gaze direction to the gaze target is determined.

In an embodiment, the captured audio is only stored locally on the device.

In an embodiment, the gaze target is on a different device than the detecting device.

In an embodiment, the gaze target is on the same device as the detecting device.

In an embodiment, the gaze target is a television or display, and the detecting device is a set-top box.

In an embodiment, the application-specific processing is specific for a television or a streaming device.

In an embodiment, detecting that the user is gazing at the gaze target includes analyzing one or more images of the user to determine whether the user is gazing at the gaze target. In an embodiment, analyzing the one or more images of the user to determine whether the user is gazing at the gaze target includes inferring from face alignment data calculated through a computer or artificial intelligence vision technique whether the user is gazing at the gaze target.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
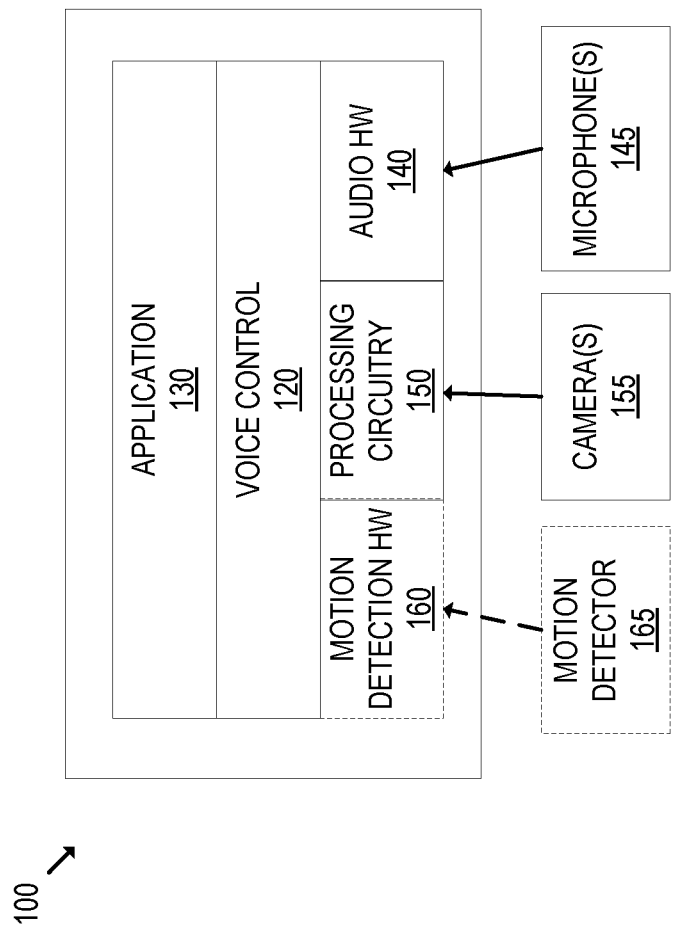
FIG. 1 is a block diagram that illustrates components of the solution for gaze-initiated voice control, according to an embodiment.

Gaze-initiated voice control is described. The solution removes the need for a wake word, or button press, for voice control completely. Instead, gaze detection is employed as the voice control initiation. The solution detects the user looking at the target to initiate voice control, and processes subsequently spoken words into commands. For example, for voice control of a television, the user can simply look at the television and speak the command.

The essence of the solution is to replace the unnatural initiation of computer voice control/interaction via wake word or button press with a natural one; gazing at the object to be controlled and/or interacted with. In an embodiment, the gaze target (the device the user looks at to control) is located on a different device than that which detects the user gazing at the gaze target. In another embodiment, the gaze target is on the same device that detects the user gazing at the gaze target. In an embodiment, the gaze target may include a provision of object-specific command/interaction processing.

There are, proposed herein, various embodiments which address one or more of the issues disclosed herein.

Certain embodiments may provide one or more of the following technical advantage(s). Initiating voice control by gaze is natural because it mirrors how humans initiate communication with each other. To speak to a person, one (usually) looks at that person first. In an embodiment for television control where pressing a button on a remote control is a usual method of initiation, there is another advantage; by not requiring the button press, the remote control can completely disappear. Thus, a remote control is not needed to initiate a voice command in an embodiment.

Thus, described herein is a new method to initiate computer voice control or voice interaction; a new method to initiate computer voice control or voice interaction that does not require the detecting device to be the target of the gaze; a new method to provide object-specific computer voice control or voice interaction; and/or a new method for TV or streaming device control not requiring a physical remote control.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The solution uses gaze detection instead of wake word detection or button press for voice control initiation. Once voice control is initiated, the voice processing pipeline is entered which may include automatic speech recognition (ASR), natural language understanding (NLU), and/or application-specific processing steps. Gaze detection is accomplished through computer vision or AI vision processing including operating on face metric data derived from the camera image of a human face.

The overall solution includes a physical camera and may include a processor capable of fast vision processing (such as a GPU or VPU).

In an embodiment, an optional motion detection step precedes the gaze detection step. This minimizes power consumption because motion detection is less compute-intensive than gaze detection. After motion is detected, gaze detection is performed.

The solution specifies multiple possible gaze targets, defined as objects in 3D space that the user needs to be looking at to initiate voice control. For example, a gaze target A may be the device which contains the camera(s) that capture the user's face—and likely the microphones that capture the user's voice—and ostensibly performs both the gaze detection and voice processing steps. As another example, a gaze target B may be any other object or point or enclosed volume in 3D space. While gaze target A is an obvious gaze target, gaze target B is not. As an example, consider gaze target A being a set-top box (STB) and gaze target B being a TV (connected to the STB). The user wants to control the TV without regard to how this control is accomplished. The natural object to look at, then, to initiate voice control, is gaze target B (the TV), and not gaze target A (the STB). The solution may include a calibration step when gaze target B is the desired gaze target. For example, during STB set-up, the user may be asked to look at their TV. The STB then remembers this gaze direction and registers it as gaze target.

There may be multiple gaze targets. Further, specific targets could have specific voice actions associated with them. For example, if gaze targets are not only recorded, but are also semantically tagged ("this is my TV", "this is my toaster") or visually inferred—through separate computer/AI vision processes, either in a setup step or in real-time, then the context of the tagged or recognized object could inform the processing of the voice command. For example, specific voice commands may only work with specific targets or perform different functions, depending on the target.

FIG. 1 is a block diagram that illustrates components of the solution, according to an embodiment. The device 100 includes an application 130 that may be specific to the device being controlled through audio input, voice control 120 that handles voice control for the application 130, audio hardware 140 that processes audio received from one or more microphones 145, processing circuitry 150 (e.g., a GPU, a VPU, a CPU) that processes images and/or video received from one or more cameras 155, and optional motion detection hardware 160 that processes motion detection received from the optional motion detector 165. The device 100 can be a media computing device (e.g., a smart television, a STB, a smart speaker, a, streaming device), a gaming device (e.g., a gaming console), or other computing device. The microphone(s) 145, the camera(s) 155, and/or the optional motion detector 165 may be integrated into the device 100 or may be connected to the device 100. The device 100 is a detecting device and may be a gaze target, as will be more fully described herein.

Figure 2:
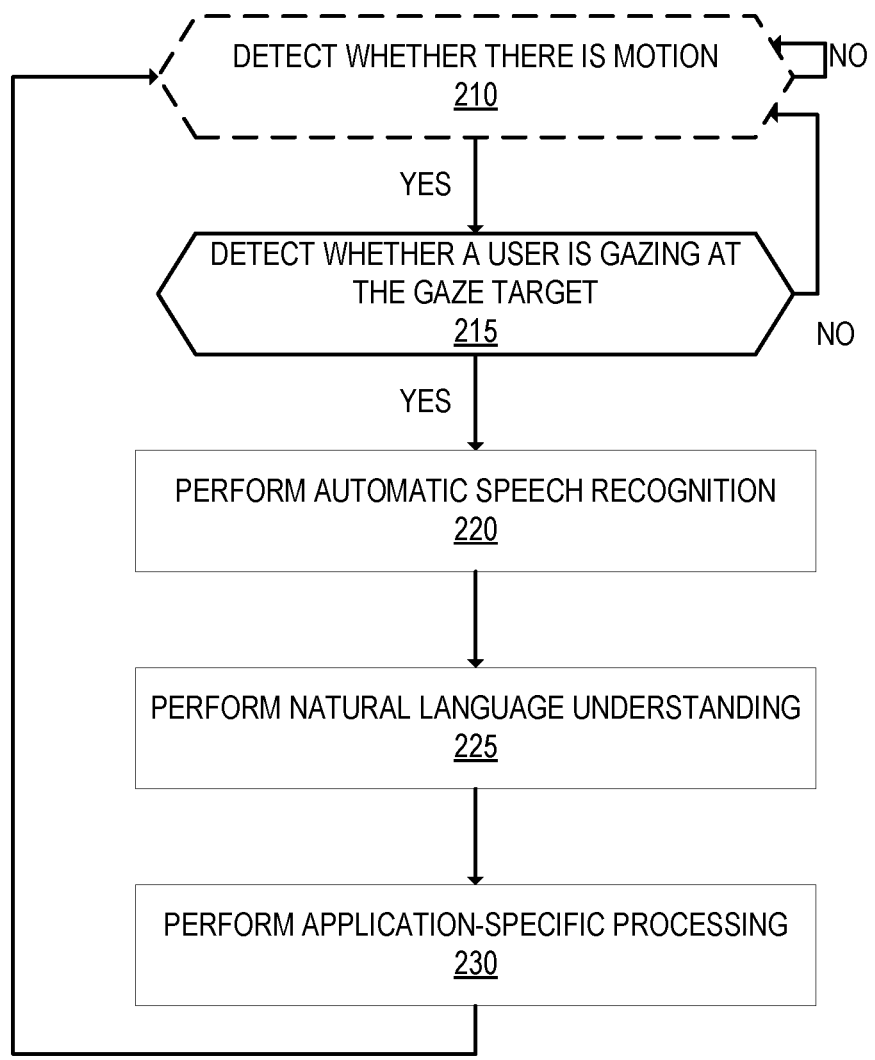
FIG. 2 is a flow diagram that shows exemplary steps of the solution for gaze-initiated voice control, according to an embodiment.

FIG. 2 is a flow diagram that shows exemplary steps of the solution, according to an embodiment. The steps of FIG. 2 will be described with respect to the exemplary embodiment of FIG. 1. However, the steps of FIG. 2 can be performed by different embodiments than those described with respect to FIG. 1, and the embodiment of FIG. 1 can perform different steps than those described with respect to FIG. 2.

At step 210, which is optional in an embodiment, the detecting device 100 detects whether there is motion. In an embodiment, the detecting device analyzes an image (e.g., a relatively low-resolution image) taken by one or more cameras 155 on or connected with the detecting device 100 to determine whether there is motion. For example, the detecting device 100 may compare a previous image with the current image to determine if there are differences. Other ways of performing motion detection may be used, such as using infrared, radio, optical, or sound. In this optional step, when there is motion detected, step 215 is then performed. Otherwise, the method includes waiting for the motion being detected. The optional motion detection step minimizes power consumption of the detecting device 100 because motion detection is less compute-intensive (and thus has less power consumption) than gaze detection by itself.

Figure 4:
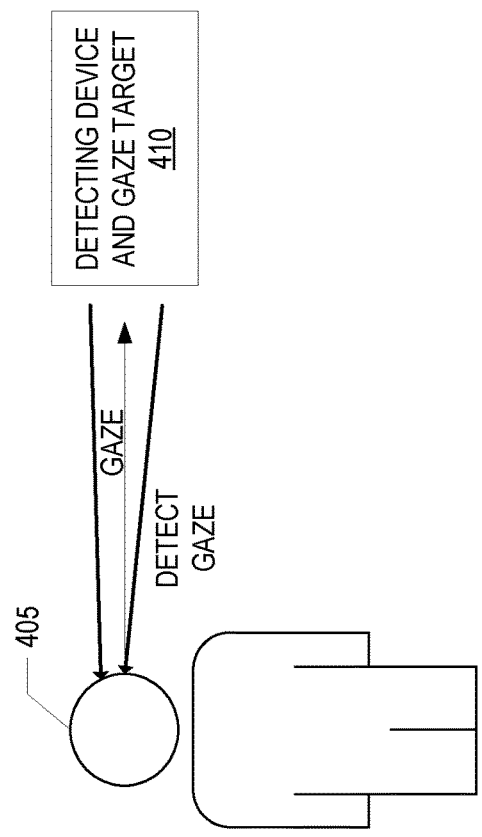
FIG. 4 shows an embodiment where the gaze target is on the detecting device, according to an embodiment.
Figure 3:
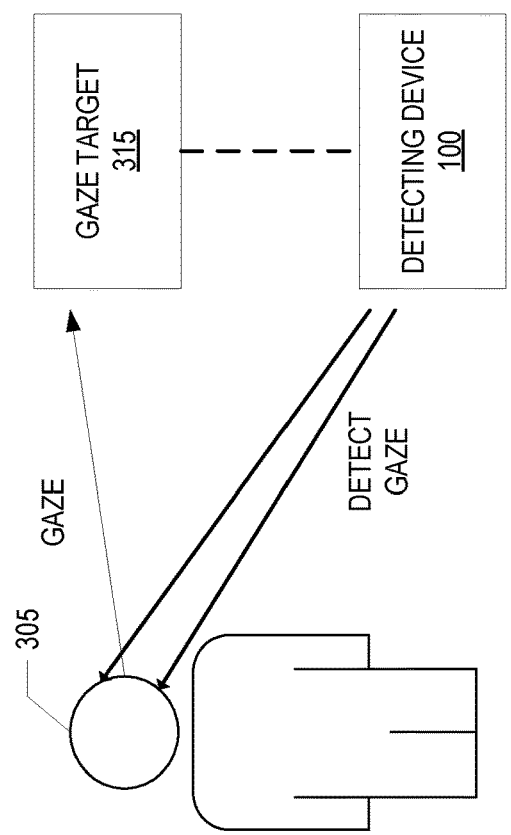
FIG. 3 shows an embodiment where the detecting device is separate from the gaze target, according to an embodiment.

At step 215, the detecting device 100 determines whether there is a user gazing at the gaze target. The gaze target may be the detecting device 100 or a part of the detecting device 100. The gaze target may be a different device than the detecting device 100. The gaze target may be any other object or spatial area in 3D space. For example, the detecting device 100 may be a STB and the gaze target may be a TV or other display. As another example, the detecting device 100 may be a TV that is also the gaze target. As another example, the detecting device may be a STB and the gaze target may be the STB. FIG. 3 shows an embodiment where the detecting device 100 is separate from the gaze target 315. The detecting device 100 detects whether the user 305 is gazing at the gaze target 315. FIG. 4 shows an embodiment where the gaze target is on the detecting device. The detecting device and gaze target 410 detects whether the user 405 is gazing at the detecting device and gaze target 410.

In an embodiment, whether a user is gazing at the gaze target can be inferred from face alignment data through computer and/or AI vision techniques. For example, the detecting device 100 may analyze one or more images (taken by one or more cameras 155 periodically) to infer whether the user is gazing at the gaze target. These image(s) may be relatively high-resolution image(s) that are taken periodically (e.g., once every 5 seconds). As another example, prior to taking high resolution images, the detecting device 100 may analyze a low-resolution image to determine whether a user is looking roughly in the direction of the gaze target prior to performing the full gaze detection process. For instance, if a person walks in front of the detection device but is clearly not looking at the gaze target (e.g., their back is facing the gaze target), the full gaze detection process may be avoided.

Figure 6:
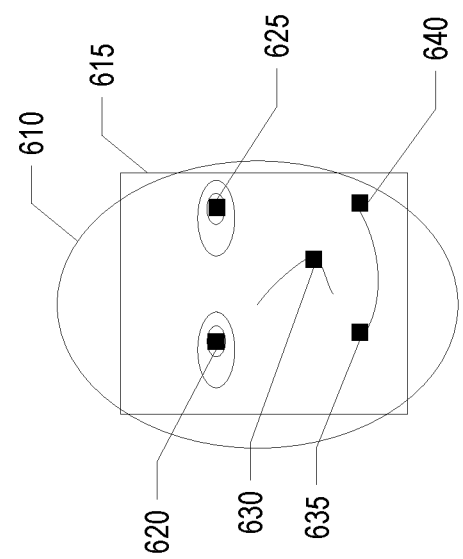
FIG. 6 shows face alignment data of the face inferring that the user is looking to the left with respect to the camera(s) that captured the image of the face.
Figure 5:
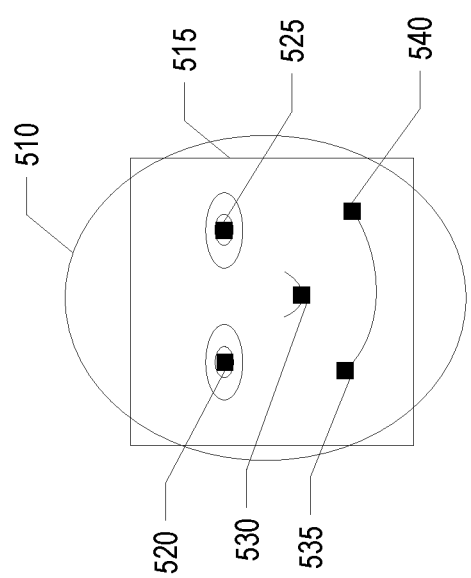
FIG. 5 shows face alignment data of a face inferring that the user is looking relatively straight ahead with respect to the camera(s) that captured the image of the face.

Face alignment data includes the position of the pupils and the tip of the nose, and may include other position information such as mouth information, within the bounding box of the face. For instance, FIGS. 5 and 6 show exemplary images of faces 510 and 610 respectively. Within the bounding box 515 of the face 510, the face alignment data includes five facial landmarks, the right eye landmark 520, the left eye landmark 525, the nose landmark 530, the right mouth corner landmark 535, and the left mouth corner landmark 540. Similarly, as shown in FIG. 6, within the bounding box 615 of the face 610, the face alignment data includes five facial landmarks, the right eye landmark 620, the left eye landmark 625, the nose landmark 630, the right mouth corner landmark 635, and the left mouth corner landmark 640. The facial landmarks are exemplary; and different, less, or more facial landmarks may be used. As shown in FIG. 5, the face alignment data of the face 510 infers that the user is looking relatively straight ahead with respect to the camera(s) 155 that captured the image of the face 510. As shown in FIG. 6, the face alignment data of the face 610 infers that the user is looking to the left with respect to the camera(s) 155 that captured the image of the face 610.

The gaze detection is a multi-stage process. The first step, after receiving the image and/or video, is for the detecting device 100 to determine face alignment data through a face alignment parameters calculation to determine the gaze direction of the user. In an embodiment, the gaze direction of the user is determined using the face alignment data. For example, if the bounding box of the eyes is determined with high accuracy, that is used to determine the angle of each eye that is then used to derive the gaze direction. If the position of the pupils within the frame of the bounding box is not determined with high accuracy, then the position of the pupils within the frame of the bounding box of the face and the nose tip is used to derive the gaze direction. There are several ways to calculate the face alignment parameters. One way is a neural network-based approach, such as used in Multi-Task Cascaded Convolutional Networks (MTCNN). MTCNN uses a cascaded architecture with three stages of convolutional networks to predict face and landmark location in a course-to-fine manner. Another way is a two-stage cascaded deformable shape model. Another way is based on a mixture of trees with a shared pool of parts where facial landmarks are modeled as a part and global mixtures are used to capture topological changes due to viewpoint. Another way is a 3D face model that is fitted to the image via convolutional neural network, known as 3D Dense Face Alignment (3DFFA). Another way is through multi-task learning that uses a tasks-constrained deep model with task-wise early stopping to facilitate learning convergence.

The next step after determining the face alignment data is for the detecting device 100 to determine whether the data indicates the user is gazing at the target. The gaze target may be registered on the detecting device. For example, if the gaze target is not located on the detecting device (e.g., it is located on another object or spatial area in 3D space), a calibration step may have been performed that remembers the gaze direction to the gaze target that is registered. The detecting device compares the determined gaze direction against the gaze target. For example, if the gaze target is 30 degrees left of the device taking the image, the detecting device determines whether the determined gaze direction is within a tolerance of 30 degrees left of the device taking the image. The tolerance may be a few degrees, plus or minus.

In an embodiment, before or after determining whether the user is gazing at the gaze target, the detecting device 100 determines whether the user is a recognized user based on facial recognition. Determining whether the user is a recognized user may be done for authentication purposes. For example, in an embodiment, if a user is not recognized, the detecting device may not perform commands received from the user, or at least certain commands. Determining whether the user is a recognized user may also be done for accessing a profile for the user.

If the detecting device 100 determines that the user is gazing at the gaze target, then the steps continue at step 220; otherwise the method goes back to step 210 (in an embodiment) or continues to wait at step 215 for a user to gaze at the gaze target.

At step 220, the detecting device captures audio and performs automatic speech recognition (ASR). ASR transforms raw voice data into text. In an embodiment, the detecting device enables the one or more microphones and begins recording audio only after detecting that the user is gazing at the gaze target. Thus, instead of using a wake word or button press as a trigger for voice processing, gaze detection is used as the trigger for voice processing. ASR may be performed in several different ways. For example, deep feedforward neural network (DNN) or other neural networks may be used for ASR. As another example, Hidden Markov Models (HMMs) may be used for ASR In an embodiment, the ASR is performed locally on the detecting device 100. That is, the raw audio samples are not transmitted to another device over the internet or into the cloud.

Next, at step 225, the detecting device performs natural language understanding (NLU). NLU derives structured information (such as intents and other semantics) from the text. The intents are application specific. For example, if the application is TV, an intent may be related to TV such as a program title, change channel, purchase program, etc. Thus, the NLU process may turn the text data from the ASR process into application-specific commands.

Next, at step 230, the detecting device performs application-specific processing. Although the raw voice data, and in some embodiments the text derived from the raw voice data, may not be transmitted to a remote device such as a server in the cloud, the command(s) generated from the NLU process may be sent to a remote server depending on the type of command. For example, if the command can be processed locally by the detecting device (e.g., change volume, change channel), the command typically will not be sent to a remote server. However, if the command cannot be processed locally by the detecting device (e.g., purchase a video asset), the command may be transmitted to a remote server for processing.

Although the detecting device may include a GPU or VPU to perform the gaze detection, in another embodiment a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide the gaze detection. For example, processing circuitry may execute instructions stored in device readable medium or in memory within processing circuitry. Such functionality may include providing any of the various features, functions, or benefits discussed herein. In some embodiments, processing circuitry may include a system on a chip (SOC). Device readable medium may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive), and/or any other volatile or non-volatile, non-transitory device readable and/or computer-executable memory devices that store information, data, and/or instructions that may be used by processing circuitry. Device readable medium may store any suitable instructions, data or information, including a computer program, software, an application including one or more of logic, rules, code, tables, etc. and/or other instructions capable of being executed by processing circuitry and, utilized by the detecting device. Device readable medium may be used to store any calculations made by processing circuitry and/or any data received via interface. In some embodiments, processing circuitry and device readable medium may be considered to be integrated.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
ASR Automatic Speech Recognition
NLU Natural Language Understanding
GPU Graphics Processing Unit
VPU Vision Processing Unit, a specialized processor for Computer Vision
HW Hardware
STB Set-top box

What is claimed is:

1. A method performed by a device for initiating voice control through gaze detection, the method comprising:
   performing a calibration step where a gaze direction to a gaze target is determined;
   determining that a user is looking roughly in a direction of the gaze target by analyzing a first image;
   after determining that the user is looking roughly in the direction of the gaze target, detecting that the user is gazing at the gaze target including:
   analyzing one or more further images of the user, wherein the one or more further images of the user are of a higher resolution than the first image, and wherein analyzing the one or more further images of the user to detect that the user is gazing at the gaze target includes determining face alignment data calculated through a computer or artificial intelligence vision technique, and
   determining that a comparison of the determined gaze direction with the determined face alignment data is within a tolerance;
   responsive to the detecting that the user is gazing at the gaze target, capturing audio and performing automatic speech recognition of the captured audio to turn the audio into text;
   performing natural language understanding on the text to determine an application-specific command; and
   performing application-specific processing for the application-specific command.

2. The method of claim 1, wherein prior to detecting that the user is gazing at the gaze target, detecting that there is motion by the user.

3. The method of claim 1, wherein the captured audio is only stored locally on the device.

4. The method of claim 1, wherein the gaze target is on a different device.

5. The method of claim 1, wherein the gaze target is a display, and the device is a media computing device or gaming device.

6. The method of claim 1, wherein the application-specific processing is specific for a television or a streaming device.

7. A device for initiating voice control through gaze detection, the device comprising:
   processing circuitry configured to perform the following steps:
   perform a calibration step where a gaze direction to a gaze target is determined;
   determine that a user is looking roughly in a direction of the gaze target by analyzing a first image;
   after the determination that the user is looking roughly in the direction of the gaze target, detect that the user is gazing at the gaze target including:
   analyzing one or more further images of the user, wherein the one or more further images of the user are of a higher resolution than the first image, and wherein analyzing the one or more further images of the user to detect that the user is gazing at the gaze target includes determining face alignment data calculated through a computer or artificial intelligence vision technique, and
   determining that a comparison of the determined gaze direction with the determined face alignment data is within a tolerance;
   responsive to detection that the user is gazing at the gaze target, cause audio hardware to capture audio and perform automatic speech recognition of the captured audio to turn the audio into text;
   perform natural language understanding on the text to determine an application-specific command; and
   perform application-specific processing for the application-specific command.

8. The device of claim 7, wherein the processing circuitry is further configured to perform the following step prior to detection that the user is gazing at the gaze target, detect that there is motion by the user.

9. The device of claim 7, wherein the captured audio is to be only stored locally on the device.

10. The device of claim 7, wherein the gaze target is on a different device.

11. The device of claim 7, wherein the gaze target is a display, and the device is a media computing device or gaming device.

12. The device of claim 7, wherein the application-specific processing is specific for a television or a streaming device.

13. A non-transitory machine-readable medium comprising computer program code which when executed by a computer carries out a method performed by a device for initiating voice control through gaze detection, the method comprising:
  performing a calibration step where a gaze direction to a gaze target is determined;
  determining that a user is looking roughly in a direction of the gaze target by analyzing a first image;
  after determining that the user is looking roughly in the direction of the gaze target, detecting that the user is gazing at the gaze target including
    analyzing one or more further images of the user, wherein the one or more further images of the user are of a higher resolution than the first image, and wherein analyzing the one or more further images of the user to detect that the user is gazing at the gaze target includes determining face alignment data calculated through a computer or artificial intelligence vision technique, and
    determining that a comparison of the determined gaze direction with the determined face alignment data is within a tolerance;
  responsive to the detecting that the user is gazing at the gaze target, capturing audio and performing automatic speech recognition of the captured audio to turn the audio into text;
  performing natural language understanding on the text to determine an application-specific command; and
  performing application-specific processing for the application-specific command.

14. The non-transitory machine-readable medium of claim 13, wherein prior to detecting that the user is gazing at the gaze target, detecting that there is motion by the user.

15. The non-transitory machine-readable medium of claim 13, wherein the captured audio is only stored locally on the device.

16. The non-transitory machine-readable medium of claim 13, wherein the gaze target is on a different device.

17. The non-transitory machine-readable medium of claim 13, wherein the gaze target is a display, and the device is a media computing device or gaming device.

18. The non-transitory machine-readable medium of claim 13, wherein the application-specific processing is specific for a television or a streaming device.

* * * * *